United States Patent [19]

McCormick

[11] Patent Number: 5,667,195

[45] Date of Patent: Sep. 16, 1997

[54] FLUID DRAIN APPARATUS

[75] Inventor: Matthew H. McCormick, Leesville, La.

[73] Assignee: Matthew Howard McCormick, Austin, Tex.

[21] Appl. No.: 557,703

[22] Filed: Nov. 13, 1995

[51] Int. Cl.[6] .................................................. F16L 37/28
[52] U.S. Cl. ........................ 251/149.6; 184/1.5; 251/149.5
[58] Field of Search ............................ 251/149.5, 149.6; 184/1.5

[56] References Cited

U.S. PATENT DOCUMENTS

| 1,659,047 | 2/1928 | Quinn. | |
|---|---|---|---|
| 1,818,122 | 8/1931 | Engbrecht. | |
| 1,818,123 | 8/1931 | Engbrecht. | |
| 1,846,877 | 2/1932 | Knapp. | |
| 3,336,053 | 8/1967 | Carse | 251/149.6 |
| 3,387,621 | 6/1968 | Schaff. | |
| 4,150,809 | 4/1979 | Muller | 251/149.6 |
| 4,269,237 | 5/1981 | Berger | 184/1.5 |
| 4,483,359 | 11/1984 | Robertson | 251/149.6 |
| 4,917,356 | 4/1990 | Shirdavani | 184/1.5 |
| 5,048,578 | 9/1991 | Dorf et al. | 184/1.5 |

FOREIGN PATENT DOCUMENTS 2754348   6/1979   Germany.

*Primary Examiner*—A. Michael Chambers

[57] ABSTRACT

A fluid drain apparatus includes a quick drain assembly which may be permanently installed on a fluid tank or receptacle, and a cooperating quickly attachable and releasable connector assembly which mates with the drain assembly. The drain and connector provide for automatic opening of a drain valve within the drain portion of the apparatus, when the connector is removably connected to the drain portion. The connector is automatically retained on the drain portion until release by a mechanic or other person, without requiring continual retaining on the drain portion by the mechanic during the draining operation. A drain hose and portable collection tank may be provided with the drain valve and connector, along with a storage hook for the hose and caps for the tank which preclude leakage from the hose or tank. A suction pump may also be provided to accelerate the fluid flow from the fluid tank being drained. The apparatus is adaptable to virtually any fluid tank or receptacle, but is particularly adapted to use with internal combustion engine oil tanks and the like.

20 Claims, 4 Drawing Sheets

FLUID DRAIN APPARATUS

FIELD OF THE INVENTION

The present invention relates generally to drain valves, plugs, and the like, and more specifically to a quick drain valve which provides automatic opening of the valve when a cooperating connector is secured thereto, thus providing for connection of the drain valve to a fluid collecting tank or other receptacle, and for opening the drain valve, simultaneously in a single operation.

BACKGROUND OF THE INVENTION

Liquids and containers therefor are used in virtually every aspect of life, from fuels and hydraulics to lubricants, chemicals, and even drinking water. In almost every situation these various fluids are stored at least temporarily in some form of container or receptacle, and the container must be drained from time to time for cleaning, replacement or replenishment of the used fluid, or for any one of a number of other reasons.

Accordingly, most tanks are equipped with some form of drain, at least where it is anticipated that the fluid normally contained therein must be drained from the tank from time to time. However, most of these drains are nothing more than a threaded cap installed over a pipe nipple or the like, or a threaded plug installed in a drain hole. When any fluid remains in the tank, the removal of the cap or plug almost always results in a relatively messy operation, even when a capture tank or other receptacle has been provided in advance to catch the draining fluid.

As a result, various quick drain valves have been developed, which require only a push, quarter turn, or some other simple and quick action, on the valve to open the valve and allow fluid to drain therefrom. However, if the valve is positioned so the fluid must be transferred to some other point via a conduit of some sort (e.g., a hydraulic reservoir in an aircraft, or water storage tank in a home, which may require a drain hose to another remotely located catch tank), the drain hose must be connected to the quick drain valve, and the quick drain valve opened, thus requiring a separate manipulation. Moreover, often the act of installing the drain hose can cause the quick drain valve to open at least partially (due to the nature of such valves), and cause some spillage before the hose is completely connected.

Generally, little harm is done if the fluid is water or other innocuous substance. But spills of caustic substances, used motor oil (a known carcinogen), hydraulic fluid, paint, etc., can be potentially quite harmful to the person performing the operation, as well as to the environment.

Accordingly, a need will be seen for a fluid drain valve which is adapted to a specialized connector, which connector causes the valve to be opened for fluid drainage simultaneously and automatically with connection of the connector to the valve. The apparatus may include a hose or other conduit, as well as an enclosed fluid catch tank adapted for the storage and disposal of the drained fluid (used oil, etc.). The drain valve may be permanently installed in the tank, sump, or other fluid container, whereby the cooperating connector may be used as required at any time with no further action required. The present apparatus is also adaptable to a vacuum device for more rapid fluid transfer.

DESCRIPTION OF THE PRIOR ART

U.S. Pat. No. 1,659,047 issued to John L. Quinn on Feb. 14, 1928 describes a Self Closing Crank Case Drainage Plug, comprising a plug with a closed top and a plurality of radially disposed passages therein. The cooperating connector includes a concentric rod which bears directly against a ball check or poppet valve in the drain plug, and may scar the valve (particularly a spherical ball check valve) and cause improper sealing. The top of the drain plug must remain closed in the Quinn device, as the spring which urges the valve closed, bears against the inside of the closed top of the valve. In contrast, the top of the present valve is open for more efficient drainage, although supplementary lateral drain passages are provided for low fluid levels. Moreover, the rod of the Quinn connector extends from the connector opening, and could contaminate any object with which it comes in contact unless a specialized cover is provided for the protruding rod. Finally, the connector does not positively seat on the valve, but must be held thereon to counteract the spring pressure within the valve, which is urging the valve closed while the connector rod bears against the valve and spring pressure to hold the valve open.

U. S. Pat. No. 1,818,122 issued to Herman J. Engbrecht on Aug. 11, 1931 describes a Receptacle Evacuating Apparatus incorporating a ball check valve in the drain plug assembly, as in the Quinn device discussed above, and having similar deficiencies. The connector is relatively complex, including a popper valve with a relatively weak spring which is overcome by vacuum applied through the drain line, and an axial sleeve which is held in an extended position by a stronger spring. The connector does not include any positive retention means to secure it to the drain.

U.S. Pat. No. 1,818,123 issued to Herman J. Engbrecht on Aug. 11, 1931 describes an Adapter For The Drain Outlets Of Crank Cases, which apparatus is similar to that of the '122 patent to the same patentee, discussed above. The device is simplified in that no secondary, vacuum actuated check valve is provided within the connector fitting, as on the device of the '122 patent. However, the connector fitting must still be held continually in place on the drain valve fitting, as in the '122 patent device, as no means is provided for retaining the connector fitting on the drain valve fitting. If pressure is released, the compressive force of the internal spring within the connector, will push the two components apart. The present invention provides positive connection means between valve and connector, thus freeing the user during the time required for draining the fluid.

U.S. Pat. No. 1,846,877 issued to Charles J. Knapp on Feb. 23, 1932 describes a Receptacle Evacuating Apparatus having an internal structure similar to the Quinn and Engbrecht devices discussed further above. However, Knapp also provides means to retain the connector fitting on the drain fitting, using a pivoting external forked fitting on the connector which engages a circumferential groove around the drain fitting. The fork is generally parallel to the axis of the connector fitting, but is perpendicular to the axis of the drain fitting. Thus, the two form a right angle when connection is made, requiring fluid flow to make a right angle turn and to flow generally horizontally at least through the connector fitting, from a vertical drain. The present invention provides an essentially straight path for the fluid, while also providing positive retention means for the connector on the drain fitting and avoiding other problems discussed above.

U.S. Pat. No. 3,387,621 issued to Peter J. Schaff on Jun. 11, 1968 describes an Oil Pan Drain Plug Assembly comprising a specialized drain port and plug and a mating hollow drain fitting. The drain port includes a valve therein which is normally closed by a compression spring, and a cap which is threaded into the port. When the cap is removed and the drain fitting threaded into the port, the end of the fitting contacts the valve and pushes it open to allow the fluid to drain. Thus, the Schaff assembly is relatively cumbersome, as four separate operations involving threaded fasteners must be accomplished to complete the draining of fluid: (1) the threaded cap must be removed from the drain, (2) the drain fitting must be threaded into the drain port, and (3) and (4) the operations must be reversed after the fluid is drained. This manipulation of threaded connections is somewhat time consuming, and the present invention avoids such multiple steps in operation. Moreover, the relatively close tolerances of threaded connections are prone to contamination and jamming.

U.S. Pat. No. 4,269,237 issued to Jurgen Berger on May 26, 1981 describes a Sump Oil Draining And Collecting Device incorporating one of two different embodiments: either a ball check valve, which deficiencies have been discussed above, or a rupturable membrane, which would require replacement after each use, thereby obviating the advantages of a quick drain apparatus by requiring the removal and replacement of the fitting anyway. Moreover, Berger fails to provide means for draining the very bottom of the container to which his apparatus is installed. While the height of the quick drain valve itself is relatively low, the connector fitting extends upwardly some distance into the drain fitting in order to contact the ball check valve therein.

U.S. Pat. No. 4,917,356 issued to Hossain A. Shirdavani on Apr. 17, 1990 describes a Low Profile, Remotely Operable Valve having a conical poppet valve which is in a normally closed position by means of a compression spring. A transverse cable runs arcuately across the end of the valve. When tension is applied to the cable, it is drawn to a generally straight alignment, thereby lifting the end of the valve and raising the valve from the seat to allow fluid to drain. However, no means is disclosed for any type of connecting device, and it is not seen how such a device could be provided, considering the cable run across the drain valve fitting with the retaining means extending from each side of the fitting.

Finally, German Patent Publication No. 2,754,348 to Jurgen Berger and published on Jun. 13, 1979 describes an oil drain plug for wet sump vehicle internal combustion engine. U. S. Pat. No. 4,269,237 issued to the same patentee on May 26, 1981 is based upon this German '348 reference, and the devices disclosed within each publication are substantially identical.

None of the above noted patents, taken either singly or in combination, are seen to disclose the specific arrangement of concepts disclosed by the present invention.

SUMMARY OF THE INVENTION

By the present invention, an improved fluid drain apparatus is disclosed.

Accordingly, one of the objects of the present invention is to provide an improved fluid drain apparatus which provides quick drain means for a fluid, and is adaptable for the drainage of various fluids from different types of tanks, but which is particularly suitable for use with internal combustion engine oil tanks.

Another of the objects of the present invention is to provide an improved fluid drain apparatus which includes a mating connector which is positively attachable to the drain portion of the apparatus by a quickly attachable and releasable mating connection, which connection requires no other retaining means by an operator or other person or object, once connected.

Yet another of the objects of the present invention is to provide an improved fluid drain apparatus which automatically opens when the mating connector is connected thereto, and which automatically closes when the mating connector is disconnected.

Still another of the objects of the present invention is to provide an improved fluid drain apparatus which drain portion may be permanently secured to the tank or other fluid receptacle to which the drain portion is adapted to drain.

A further object of the present invention is to provide an improved fluid drain apparatus which may include a drain hose or conduit extending from the connector portion and a portable receptacle for capturing the drained fluid, as well as vacuum or suction means to accelerate the draining of fluid from a tank.

A final object of the present invention is to provide an improved fluid drain apparatus for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
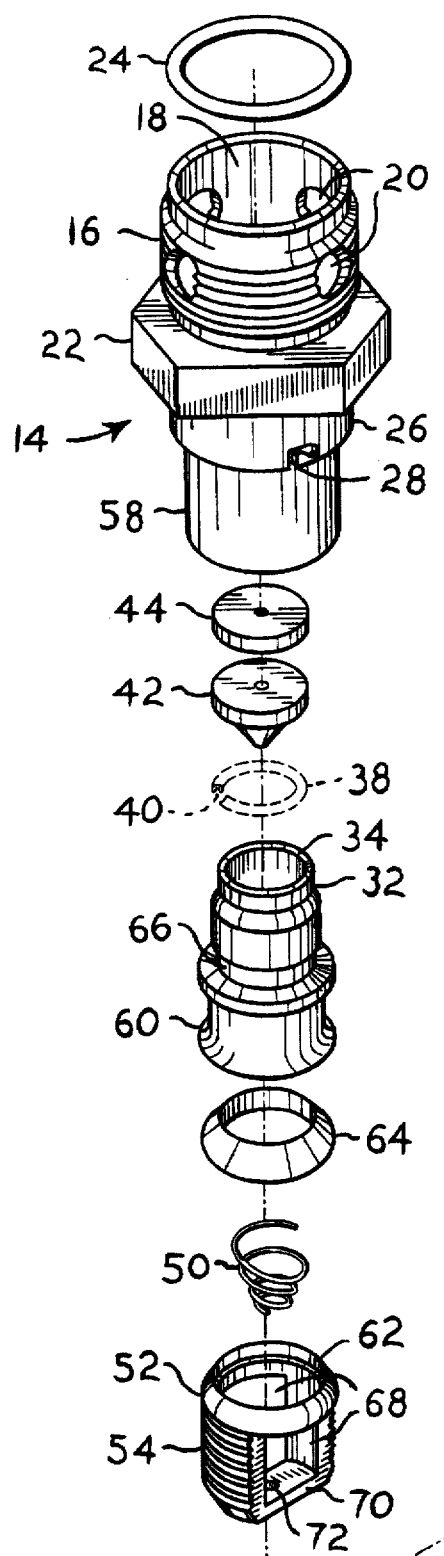
FIG. 1 is an exploded perspective view of the quick drain valve portion and quick connector portion of the present fluid drain apparatus, showing the relationship of the various components.
Figure 1:
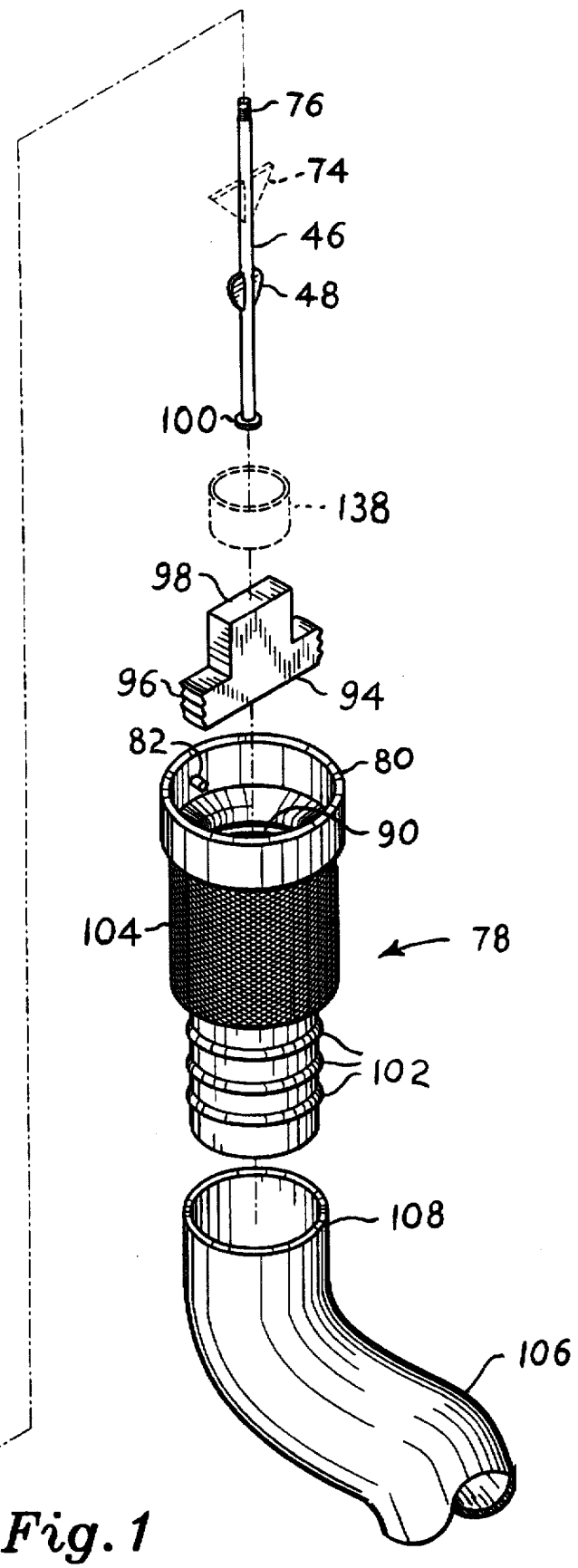

Referring now particularly to FIG. 1 of the drawings, the present invention will be seen to relate to a fluid drain apparatus, adapted for the quick draining of fluids from a tank or other receptacle in which they may be stored, without need for tools or time consuming and cumbersome manipulation of components. The apparatus may also include a portable storage tank and drain hose, with the entire apparatus providing a clean and spill free transfer of fluid from the tank or receptacle being drained, to the storage tank for disposal.

Figure 2:
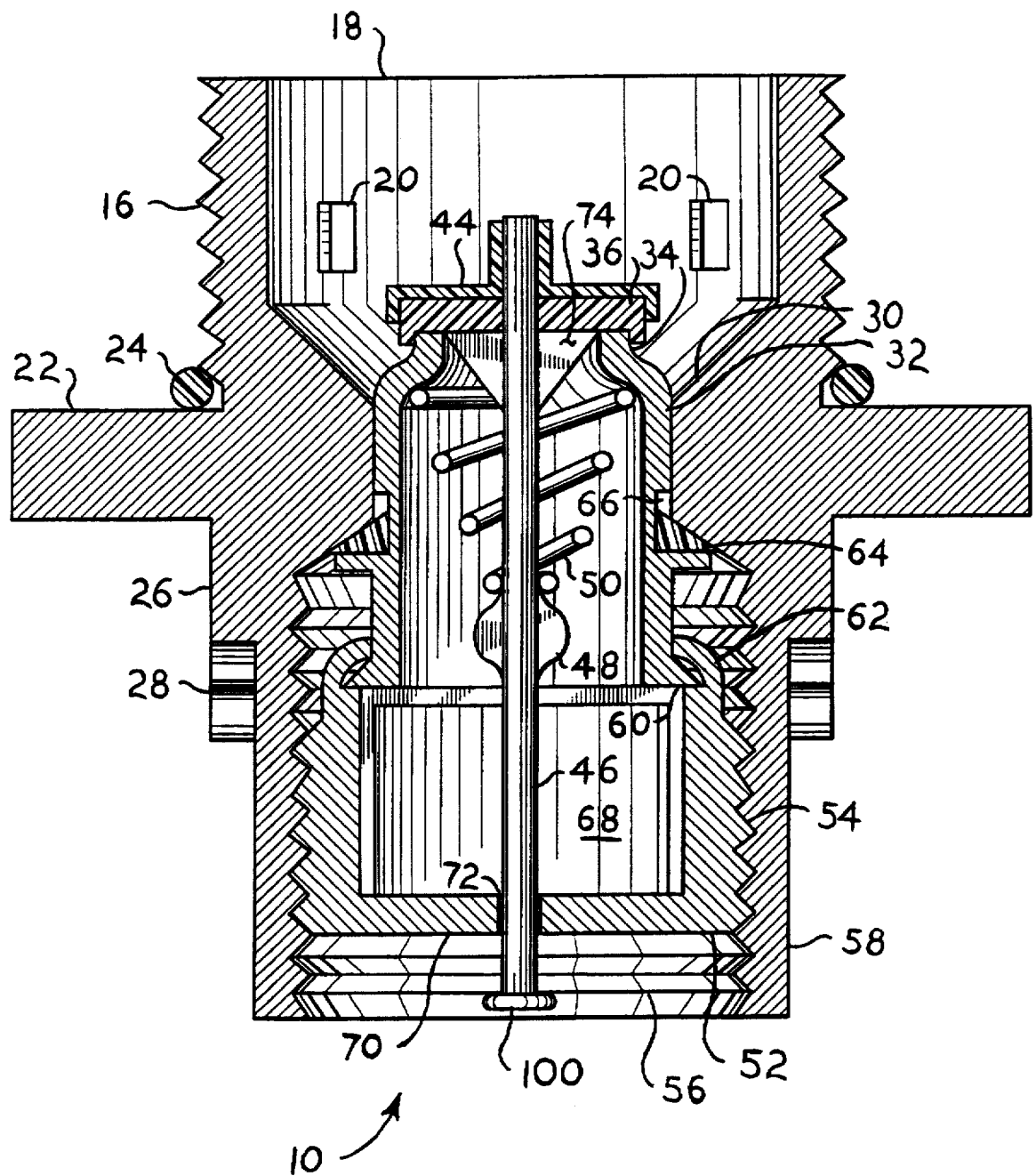
FIG. 2 is an elevation view in section of the quick drain valve portion of the present fluid drain apparatus, showing details of its assembly.
Figure 3:
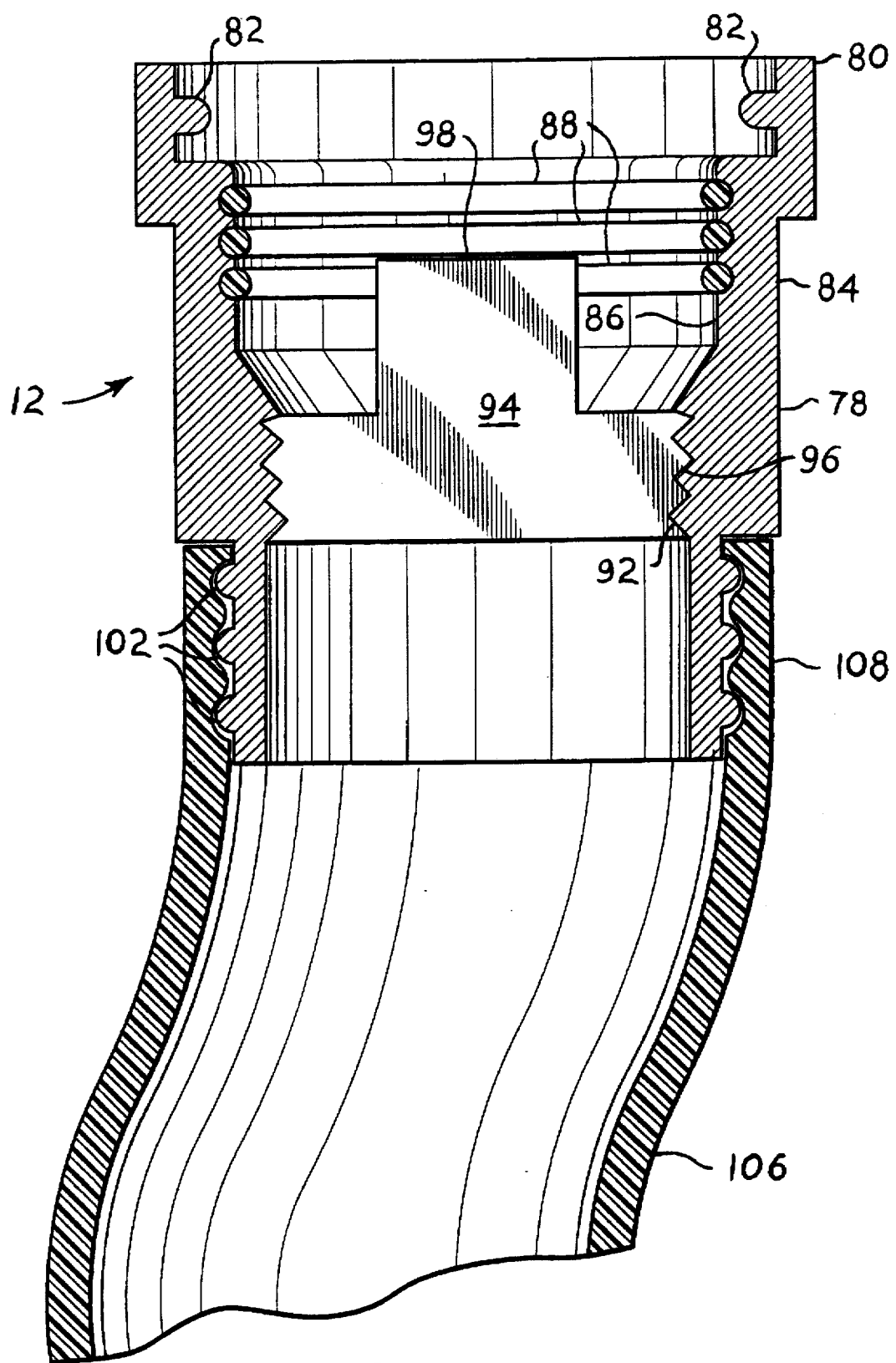
FIG. 3 is an elevation view in section of the quick connector portion of the present fluid drain apparatus with a drain hose attached thereto, showing details of its assembly.

The upper portion of the apparatus includes a quick drain valve assembly 10 (shown in detail in the section view of FIG. 2) and a connector assembly 12 (shown in detail in the section view of FIG. 3). The relationship of the various components therein, and the relationship of the two assemblies 10 and 12, are shown in the exploded perspective view of FIG. 1.

The quick drain valve assembly includes a hollow body 14 having a generally cylindrical threaded upper portion 16 which is adapted to be installed into the cooperating threaded female fitting of a conventional fluid tank (not shown), such as an oil pan or sump for an internal combustion engine, or any other suitable fluid container, reservoir or tank. The upper portion 16 has an open top 18, providing for the entrance of drain fluid therein, and may include one or more square or round drain ports 20 therearound, which ports 20 are disposed close to the base of the cylindrical upper portion 16 in order to provide for the drainage of fluid from the very bottom surface of the tank. The quick drain assembly 10 is adapted for permanent or at least semipermanent installation into the drain port of a fluid tank, and includes a hexagonal fitting 22 thereon so a wrench may be used to tighten the assembly 10 into the tank fitting. A gasket, ring, or washer 24 may be provided to provide a leak proof seal for the installation.

The present apparatus provides for the quick connection and disconnection of the drain valve assembly 10 and connector assembly 12 from one another, and accordingly, the drain valve assembly 10 includes an attachment ring 26 having at least two elongate slots 28 radially disposed therein. These slots 28 accept a like number of inwardly disposed bayonet pins in the connector assembly 12, to provide a bayonet type connection between the two assemblies 10/12.

The drain valve assembly 10 includes a drain valve and related components therein, the assembly of which is more clearly shown in FIG. 2. However, the configuration and relationship of many of the components comprising the assembly may be more clearly determined in a review of FIG. 1. The hollow body 14 includes a necked down medial portion 30 therein, adapted to fit closely a generally cylindrical valve body 32 removably installed therein. The valve body 32 includes an upper valve seat 34 having a circular peripheral upper edge, adapted to provide a good seal between the seat edge 34 and the resilient sealing portion of a poppet valve providing closure of the valve body 32. The sealing portion may comprise a generally flat, round disc 36 (FIG. 2) of resilient material, a round O-ring 38 (shown alternatively in broken lines in FIG. 1) of resilient material with a circumferential channel 40 formed therein and adapted to mate with the upper edge seat 34 of the valve body, or a conically shaped resilient valve 42 (in solid lines in FIG. 1) providing closure and sealing of valve body 32.

Whatever the selected shape or configuration of the valve seal 36 through 42 may be, the resilient valve material is held in place by a round valve retainer plate 44, functioning somewhat in the manner of a valve spring retainer for an internal combustion engine poppet valve. The resilient valve 36, 38, or 42 is seated within the retainer 44, which in turn is secured (swaged, welded, pinned, threaded, etc.) to one end of a valve actuating stem 46. The valve stem or pin 46 includes a widened spring retainer portion 48 stamped or otherwise formed generally medially therealong, which serves to capture a valve closure compression spring 50 between the spring retainer portion 48 of the valve stem 46 and the reduced diameter upper portion of the valve body 32 below the seat 34.

The above described assembly comprising the valve body 32, valve means 36/38/42, retainer 44, valve actuating pin or stem 46, and valve closure compression spring 50, is held in place within the hollow body 14 by a valve stem guide and valve body and seat assembly retainer 52. The valve guide/ seat retainer 52 includes a threaded exterior portion 54, which cooperates with mating female threads 56 within the lower portion 58 of the hollow body shell 14. The valve guide/seat retainer 52 is secured to a widened conical flange 60 about the lower end of the valve body 32, by means of a rim 62 which extends upwardly from the valve guide and seat retainer 52, and is crimped or otherwise formed tightly about the conical flange 60 of the valve body 32 to secure the two components 32 and 52 tightly and immovably together relative to one another. A leak proof seal is provided between the valve body 32 and the hollow drain valve body 14 by means of a toroidally shaped gasket or seal 64, which is located in a circumferential groove 66 about the valve body The valve guide/seat retainer 52 forms a fully circular shape where the upper rim 62 is formed, but includes a cut away open portion 68 on either side therebelow, in order to provide for fluid drainage through this portion of the assembly. The threaded sides 54 include a diametric valve stem guide plate 70 extending across the bottom of the guide and seat retainer 52, with the plate 70 including a central axial valve guide passage 72 therein to provide central axial location and guidance for the lower portion of the valve stem 46. The upper end of the valve stem is located by a pair of triangular flanges 74, shown optionally in broken lines in FIG. 1, or alternatively by using the conical valve 42 configuration to guide the locate the valve relative to the valve seat 34.

The above described assembly comprising the valve body 32, valve means 36/38/42, retainer 44, valve actuating pin or stem 46, and valve closure compression spring 50, may be easily removed from the hollow drain valve body 14 merely by unthreading the threaded valve guide and valve seat assembly retainer 52 from the lower portion 58 of the body 14. If the valve stem 46 upper end is secured to the valve retainer 44 by means of threads 76 (shown in FIG. 1) or other easily removable means, the valve 36/38/42 may be easily removed from the valve stem 46 by unscrewing the retainer 44 from the threaded upper end 76 of the stem 46, replacing the valve 36/38/42 held therein, and reassembling the above components. The entire poppet valve replacement procedure requires only a few minutes once the tank or fluid receptacle to which the quick drain assembly 10 is installed, has been drained.

The connector assembly portion 12 of the present quick drain apparatus is disclosed in FIG. 3 and the lower right portion of FIG. 1. The connector assembly 12 comprises a hollow generally cylindrical body portion 78 having an open upper attachment ring end 80. This attachment ring 80 is adapted to fit closely about the outer circumference of the attachment ring portion 26 of the quick drain assembly 10 discussed in detail above, and includes a corresponding number of inwardly directed radially disposed bayonet pins 82, adapted to engage the elongated slots 28 of the cooperating fitting 26 of the assembly 10. Thus, the connector fitting 12 may be removably connected to the quick drain fitting 10, by pushing the female attachment ring 80 of the connector assembly 12 upwardly around the male attachment ring 26 of the quick drain assembly 10, and turning the connector assembly 12 a fraction of a turn to engage the pins 82 within the slots 28.

The upper portion 84 of the connector body 78 has a generally cylindrical inner wall or tube 86, which may include some form of resilient sealing means which fits closely against the cylindrical lower portion 58 of the quick drain body 14 and preclude fluid flow therebetween. This sealing means may comprise one or more O-rings 88 of resilient material installed internally within the cylindrical inner wall 86 of the connector body 78, or alternatively may comprise a sleeve 90 of resilient material (the upper portion of which is visible in FIG. 1) which is installed within the upper portion 84 of the connector body 78. Either means may be used, and provides a secure seal between the quick drain and connector assemblies 10 and 12 to preclude fluid flow backing up between the two and spilling from the bayonet connection between the two components 10 and 12 when they are connected together.

The connector body 78 also includes an internally threaded portion 92, providing for the threaded installation of a valve lifter 94 therein. The lifter 94 comprises a flat plate of material, in order to allow fluid flow therepast to either side through the connector body 78. The lifter 94 includes cooperating threads 96 along opposite edges, adapted to thread into the connector body 78 as described above and shown in FIG. 3. The lifter 94 also includes a raised central valve stem contact portion 98, which is adapted to contact a button 100 or other construction on the lower end of the valve stem 46. The lower portion of the connector body 78 is adapted to accept a drain hose thereover, and may include ridges 102 or other hose retaining means thereon. Preferably, the outer surface of the connector body 78 is provided with a toughened texture or surface 104 (knurled, etc.) in order to provide a good grip means for the user of the present apparatus.

The above described apparatus provides simultaneous quick connection of the connector assembly 12 to the quick drain assembly 10 and automatic opening of the valve 36/38/42. The quick drain assembly 10 is secured into the drain fitting of the tank or fluid receptacle (engine oil sump drain, etc.) as desired, and the connector assembly 12 is connected thereto by the bayonet fitting described further above. When the connector assembly 12 is pushed upward against the bottom of the quick drain assembly 10 to engage the bayonet fittings and secure the connector assembly 12 to the quick drain assembly 10, the valve stem contact portion 98 of the valve lifter 94 which is installed within the connector assembly 12, contacts the bottom end 100 of the valve stem 46, forcing it upward against the compressive pressure of the valve spring 50 bearing against the spring retainer flats 48 formed on the sides of the valve stem 46. (A lateral pin, not shown, or other means may be used to retain the spring 50 relative to the valve stem 46.)

As the valve stem 46 is forced upward, it will lift the valve retainer 44 secured to the upper end of the stem 46, and any valve means 36/38/42 therein, from the valve seat 34 of the valve body 32, thereby allowing fluid to flow between the valve 36/38/42 and the valve seat 34, through the valve body 32 and body retainer 52, out of the quick drain assembly 10 and through the connector assembly 12 past the valve lifter 94. The entire apparatus comprising the quick drain assembly 10 and connector assembly may be left in place as required until fluid drainage is completed, with the connector assembly 12 being precluded from slippage relative to the quick drain assembly 10, by means of the pressure of the spring 50 bearing against the valve stem 46 and thus against the valve lifter 94 secured within the connector assembly 12.

Figure 4:
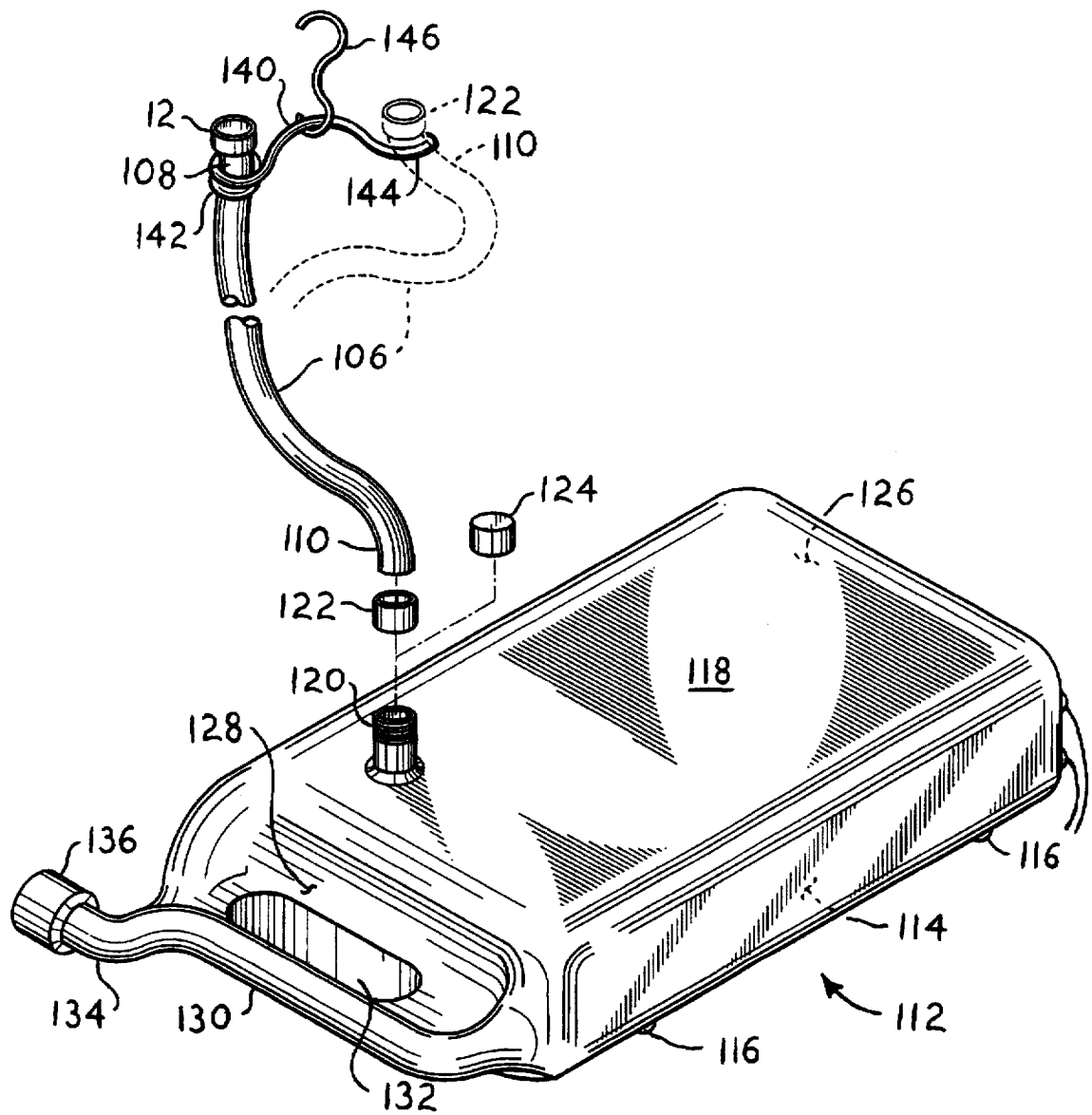
FIG. 4 is an exploded perspective view of a portable storage tank and drain hose assembly for the present fluid drain apparatus, showing the relationship of the components and means for securing the drain hose to preclude leakage therefrom.

The above described apparatus and operation serves only to drain fluid from the fluid tank to which the quick drain assembly 10 is secured, and does nothing to convey the drained fluid to another area or holding tank. Accordingly, such fluid conveyance and storage means are also provided with the present apparatus. A transfer hose 106 having a drain connector assembly end 108 and an opposite outflow end 110 is provided to conduct drained fluid from the connector assembly 12 to a portable fluid collection tank or receptacle 112, shown in FIG. 4. (It should be noted that the connector assembly 12 in FIG. 4, to which the connector assembly end 108 of the hose 106 is shown attached, is shown only very generally in this figure, for clarity in the drawings. Reference is made to FIGS. 1 and 3 for detailed views of this component.)

The tank 112 is preferably formed to have a relatively low and flat rectangular shape, in order to fit beneath a vehicle or other object with relatively little ground clearance. Preferably, a capacity of at least five and one half quarts is provided, which is generally adequate to accept the contents of the engine oil sumps of most passenger vehicles. Other sizes or volumes may be provided as required. The rectangular shape provides a flat first or bottom side or surface 114 which has a plurality of protrusions or "feet" 116 (preferably at least four, with one at each corner) extending therefrom to support the tank 112 when it is laid upon its side. The opposite second, upper or top side or surface 118 includes a low, short threaded intake pipe 120 extending therefrom, providing for the connection of the outflow end 110 of the transfer hose 106 thereto. A cooperating threaded adapter 122 provides a tight, leak proof seal for the hose end 110 and pipe 120, and a threaded closure cap 124 seals the pipe 120 when the tank 112 is not in use.

The generally rectangular configuration of the tank 112 provides for a first end 126, which is normal to the two generally parallel first and second sides 114 and 118 of the tank 112. This first end 126 includes a plurality of feet 116 extending therefrom (preferably at least four, with one each disposed at each corner of the first end 126), so that the tank 112 may be stood upright on the feet 116 of the first end 126 for more compact storage when not in use. The opposite second end 128 includes a fluid outlet spout 130 extending thereacross, with the central portion of the spout 130 being spaced away from the second end 128 of the tank 112 to provide a hand passage 132 between the spout 130 and the second end 128 of the tank 112. Thus, a user of the tank 112 may place the tank 112 to rest upright upon its first end 126 and feet 116 extending therefrom, and carry the tank 112 by means of the handle provided by the spaced away configuration of the spout 130. The outlet end 134 of the spout 130 may include a closure cap 136 to preclude spillage of any fluid within the tank 112 when it is resting upon its first side 114.

The above described apparatus is used by placing the empty collection tank 112 on its first side 114 and connecting the outlet end 110 of the transfer hose 106 to the inlet pipe 120 of the tank 112, using the leak proof connector or coupling 122 as required. The opposite or connector assembly end 108 of the hose 106, with the connector assembly 12 secured thereto, is connected to the quick drain valve assembly 10 using the cooperating bayonet fitting means as described further above, which also serves to open the drain valve 36/38/42 automatically to allow fluid to flow from the assembly 10, through the hose 106, and into the collection tank or receptacle 112.

When the draining of the fluid has been completed as desired, the connector assembly 12 may be disconnected from the quick drain valve assembly 10, and the opposite end 110 of the hose 106 disconnected from the tank 112 and the inlet pipe 120 of the tank 112 closed by means of the cap 124. The open end of the quick drain valve assembly 10 may also be covered by a quickly removable and installable protective cap 138 (shown in broken lines in FIG. 1) as desired.

In order to preclude any residual fluid within the hose 106 from dripping from either end 108 or 110, a hose storage hanger 140 is provided. The hanger 140 may be formed of wire or other suitable material, and includes a first support loop end 142 and an opposite second support loop end 144, respectively providing for the raised support of the first and second ends 108/110 of the hose 106 when it is not in use. The hanger 140 also includes a generally medially disposed support hook 146 providing for the hose storage hanger 140 and hose 106 which may be suspended therefrom, to be hung upon a wall or otherwise stored between uses.

In summary, the above described fluid drain apparatus will be seen to provide an extremely rapid, convenient, and clean means of draining fluids from various fluid tanks as required or desired. The apparatus may be adapted for use in the drainage of virtually any fluids, but is particularly well suited for use with fluids which may be messy, caustic, or hazardous in some other way. The present apparatus allows the user thereof to drain such fluids from one point into a collection tank, without ever contacting the fluid in any way. Thus, the present apparatus provides an economical solution for the handling and transfer of fluids which are recognized to be hazardous in some form or another.

The present apparatus will also be seen to be of significant value in commercial operations, where motor vehicle oil is changed and handled regularly. With the incorporation of a drain valve assembly 10 into the oil drain plug receptacle of a motor vehicle, the present apparatus enables the user to change oil quickly and easily without ever contacting the contaminated oil. While the present apparatus is of value in virtually any automotive maintenance business, or by mechanically inclined owners and/or operators of privately owned vehicles, it will be seen that the present invention is of great value to operators of motor vehicle fleets, such as governmental agencies and rental businesses, who are prepared to equip their entire fleets with the required drain valve assemblies. Such fleet operations will appreciate the speed provided by using the present apparatus also, and even further speed and efficiency may be gained by using a vacuum system of some sort (not shown) to draw the used fluid from its tank or reservoir. Thus, the present invention provides a considerable advance over earlier devices and methods used for performing motor vehicle oil changes, or for transferring fluids of virtually any sort from one container to another.

It is to be understood that the present invention is not limited to the sole embodiment described above, but encompasses any and all embodiments within the scope of the following claims.

I claim:

1. A fluid drain apparatus, comprising:

a quick drain valve assembly adapted for permanent installation to a fluid tank, and a connector assembly removably connectable to said quick drain valve assembly in coaxial alignment therewith, with said fluid drain apparatus defining an essentially straight fluid path therethrough for the flow of fluid therethrough;

said quick drain valve assembly and said connector assembly each including mating means providing for the selective quick connection theretogether and disconnection thereapart of each said assembly to one another, with said mating means requiring no more than a partial revolution of said connector assembly relative to said drain valve assembly for connection and disconnection thereto, and with said connector assembly being positively retained upon said drain valve assembly when said drain valve assembly and said connector assembly are removably connected together, and;

said quick drain valve assembly further including an axial drain valve actuating stem installed therein communicating with an axially disposed poppet drain valve with said drain valve being held normally closed by a coaxially disposed valve closure compression spring biased against said valve stem, and said connector assembly including a drain valve stem lifter installed therein, so that said drain valve stem lifter contacts said drain valve actuating stem when said connector assembly is connected to said drain valve assembly and lifts said valve stem against said compression spring, thereby opening said drain valve to allow fluid to drain from the fluid tank to which said drain valve assembly is installed, through said fluid drain apparatus.

2. The fluid drain apparatus of claim 1, wherein:

said mating means of said quick drain assembly and connector assembly comprises a bayonet fitting, with said quick drain assembly including a circumferential sleeve having a plurality of radially disposed elongate slots therein and said connector fitting including a circumferential sleeve including a corresponding number of radial pins extending inwardly therefrom, with said connector fitting sleeve adapted to fit externally about said quick drain assembly sleeve and said connector pins adapted to engage said slots of said quick drain assembly to secure said connector assembly removably to said quick drain assembly.

3. The fluid drain apparatus of claim 1, wherein:

said quick drain assembly includes a hollow body having a generally cylindrical threaded upper portion adapted to be threadedly installed into a cooperating fitting of the fluid tank, with said upper portion including at least one peripheral drain port therein providing for the drainage of fluid from a lowermost level of the fluid tank.

4. The fluid drain apparatus of claim 1, wherein:

said quick drain assembly includes a hollow body including a poppet valve seat and closure spring assembly with a valve stem guide and valve seat assembly retainer threadedly installed therein, with said valve stem guide and valve seat assembly retainer adapted to be threadedly removed from said hollow body as required and thereby providing access to said poppet valve for the replacement thereof as required without need for removal of said body from the fluid tank.

5. The fluid drain apparatus of claim 1, wherein:

said quick drain assembly includes a circumferential poppet valve seat, and said poppet valve comprises a round plate having a flat disc of resilient material therein adapted to seal closely against said valve seat by means of said valve closure compression spring.

6. The fluid drain apparatus of claim 1, wherein:

said quick drain assembly includes a circumferential poppet valve seat having a peripheral edge, and said popper valve comprises a round plate having a circular ring of resilient material therein, with said circular ring including a circumferential channel therearound adapted to seal closely against said valve seat edge by means of said valve closure compression spring.

7. The fluid drain apparatus of claim 1, wherein:

said quick drain assembly includes a cylindrical lower portion, and said connector assembly generally comprises a hollow body including a generally cylindrical inner wall having resilient sealing means therein adapted to seal closely about said lower portion of said quick drain assembly when said quick drain assembly and said connector assembly are assembled together.

8. The fluid drain apparatus of claim 7, wherein:

said resilient sealing means comprises at least one internal O-ring circumferentially disposed within said hollow body of said connector assembly.

9. The fluid drain apparatus of claim 1, wherein:

said connector assembly includes grip means comprising a roughened outer surface disposed over at least a portion thereof.

10. The fluid drain apparatus of claim 1, wherein:

said fluid drain apparatus further includes a portable fluid collection tank, and a transfer hose adapted for the transfer of fluid from said quick drain assembly to said fluid collection tank.

11. The fluid drain apparatus of claim 10, wherein:

said tank generally comprises a low, flat, rectangular container having a capacity of at least five and one half fluid quarts, with said tank including a bottom side having a plurality of feet extending therefrom, an opposite top side having a short fluid intake pipe therein, a first end having a plurality of feet extending therefrom, and an opposite second end having a fluid outlet spout extending therefrom, with said outlet spout adapted to provide handle means for carrying said tank as desired, and;

said transfer hose has a first end and an opposite second end, and includes a storage hanger providing for the raised support of said first end and said second end to preclude any residual fluid therein from leaking therefrom during storage of said hose.

12. A fluid drain apparatus, comprising:

a quick drain valve assembly adapted for permanent installation to a fluid tank, and a connector assembly removably connectable to said quick drain valve assembly in coaxial alignment therewith, with said drain and connector defining an essentially straight path therethrough for the flow of fluid therethrough;

said quick drain valve assembly and said connector assembly each including mating means providing for the selective quick connection theretogether and disconnection thereapart of each said assembly to one another, with said mating means requiring no more than a partial revolution of said connector assembly relative to said drain valve assembly for connection and disconnection thereto, and with said connector assembly being positively retained upon said drain valve assembly when said drain valve assembly and said connector assembly are removably connected together;

said quick drain valve assembly further including an axial drain valve actuating stem installed therein communicating with an axially disposed popper drain valve with said drain valve being held normally closed by a coaxially disposed valve closure compression spring biased against said valve stem, and said connector assembly including a drain valve stem lifter installed therein, so that said drain valve stem lifter contacts said drain valve stem when said connector assembly is connected to said drain valve assembly and lifts said valve stem against said compression spring, thereby opening said drain valve to allow fluid to drain from the fluid tank to which said drain valve assembly is installed, through said quick drain valve and said connector, and;

a portable fluid collection tank, and a transfer hose adapted for transfer of fluid from said quick drain assembly to said tank.

13. The fluid drain apparatus of claim 12, wherein:

said mating means of said quick drain assembly and connector assembly comprises a bayonet fitting, with said quick drain assembly including a circumferential sleeve having a plurality of radially disposed elongate slots therein and said connector fitting including a circumferential sleeve including a corresponding number of radial pins extending inwardly therefrom, with said connector fitting sleeve adapted to fit around said quick drain assembly sleeve and said connector pins adapted to engage said slots of said quick drain assembly to secure said connector assembly removably to said quick drain assembly.

14. The fluid drain apparatus of claim 12, wherein:

said quick drain assembly includes a hollow body having a generally cylindrical threaded upper portion adapted to be threadedly installed into a cooperating fitting of the fluid tank, with said upper portion including at least one peripheral drain port therein providing for the drainage of fluid from a lowermost level of the fluid tank.

15. The fluid drain apparatus of claim 12, wherein:

said quick drain assembly includes a hollow body including a poppet valve seat and closure spring assembly with a valve actuating stem guide and valve seat assembly retainer threadedly installed therein, with said valve guide and valve seat assembly retainer adapted to be threadedly removed from said hollow body as required and thereby providing access to said poppet valve for the replacement thereof as required without need for removal of said body from the fluid tank.

16. The fluid drain apparatus of claim 12, wherein:

said quick drain assembly includes a circumferential popper valve seat, and said poppet valve comprises a round plate having a flat disc of resilient material therein adapted to seal closely against said valve seat by means of said valve closure compression spring.

17. The fluid drain apparatus of claim 12, wherein:

said quick drain assembly includes a circumferential poppet valve seat having a peripheral edge, and said popper valve comprises a round plate having a circular ring of resilient material therein, with said circular ring including a circumferential channel therearound adapted to seal closely against said valve seat edge by means of said valve closure spring.

18. The fluid drain apparatus of claim 12, wherein:

said quick drain assembly includes a cylindrical lower portion, and said connector assembly generally comprises a hollow body including a generally cylindrical inner wall having resilient sealing means therein adapted to seal closely about said lower portion of said quick drain assembly when said quick drain assembly and said connector assembly are assembled together with said resilient sealing means comprising at least one internal O-ring circumferentially disposed within said hollow body of said connector assembly.

19. The fluid drain apparatus of claim 12, wherein:

said connector assembly includes grip means comprising a roughened outer surface disposed over at least a portion thereof.

20. The fluid drain apparatus of claim 12, wherein:

said tank generally comprises a low, flat, rectangular container having a capacity of at least five and one half fluid quarts, with said tank including a bottom side having a plurality of feet extending therefrom, an opposite top side having a short fluid intake pipe therein, a first end having a plurality of feet extending therefrom, and an opposite second end having a fluid outlet spout extending therefrom, with said outlet spout adapted to provide handle means for carrying said tank as desired, and;

said transfer hose has a first end and an opposite second end, and includes a storage hanger providing for the raised support of said first end and said second end to preclude any residual fluid therein from leaking therefrom during storage of said hose.

* * * * *